(12) United States Patent
Yerant et al.

(10) Patent No.: US 12,134,462 B2
(45) Date of Patent: Nov. 5, 2024

(54) FOLDING CONTROL STICK AND LOCKING MECHANISM

(71) Applicant: Lockheed Martin Corporation, Bethesda, MD (US)

(72) Inventors: John Stephen Yerant, Milford, CT (US); Timothy Heising Bean, Trumbull, CT (US); Stephen V. Poulin, Milford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 155 days.

(21) Appl. No.: 17/974,824

(22) Filed: Oct. 27, 2022

(65) Prior Publication Data

US 2024/0140592 A1    May 2, 2024

(51) Int. Cl.
*B64C 13/04* (2006.01)
*B64C 13/14* (2006.01)
*B64C 27/56* (2006.01)

(52) U.S. Cl.
CPC .......... *B64C 13/14* (2013.01); *B64C 13/0421* (2018.01); *B64C 27/56* (2013.01)

(58) Field of Classification Search
CPC ..... B64C 13/0421; B64C 13/12; B64C 13/14; B64C 13/06; B64C 27/56; Y10T 74/20618
See application file for complete search history.

(56) References Cited

U.S. PATENT DOCUMENTS

| | | | |
|---|---|---|---|
| 1,874,522 A | | 8/1932 | Henrichsen |
| 2,514,212 A | * | 7/1950 | Jennings ................. B64C 27/56 74/544 |
| 3,936,015 A | * | 2/1976 | Dean ....................... B64C 27/56 244/234 |
| 5,328,285 A | * | 7/1994 | Grubbs .................. B60K 20/02 403/66 |
| 5,427,336 A | * | 6/1995 | Haggerty ............ B64C 13/0421 244/234 |
| 6,347,770 B1 | * | 2/2002 | Oyzerskiy ........... B64C 13/0421 244/221 |
| 10,160,534 B2 | | 12/2018 | Wong et al. |
| 11,040,770 B2 | | 6/2021 | Bredenbeck et al. |

(Continued)

FOREIGN PATENT DOCUMENTS

FR    3005032 A1 * 10/2014 ............. B64C 27/56
WO    2023277847 A1    1/2023

*Primary Examiner* — Richard Green
(74) *Attorney, Agent, or Firm* — Michael Best & Friedrich LLP (57) ABSTRACT

A control input operable by a user for controlling movement of an aircraft includes a base portion configured for coupling to a support surface, the base portion biased towards a neutral position defined along a central axis and pivotable to a plurality of angular positions relative to the central axis. The control input also includes a grip portion having inputs for controlling movement of the aircraft and pivotally coupled to the base portion, the grip portion pivotable between a first position in which the grip portion extends from the base portion and a second position in which the grip portion is pivoted relative to the base portion. Further, the control input includes a lock mechanism for locking the grip portion in the first position wherein releasing the lock mechanism allows the grip portion to move to the second position.

19 Claims, 7 Drawing Sheets

(56) References Cited

U.S. PATENT DOCUMENTS

| | | | |
|---|---|---|---|
| 11,673,649 B2* | 6/2023 | English | B64C 13/0421 244/223 |
| 2018/0148167 A1 | 5/2018 | Bihel et al. | |
| 2019/0263504 A1 | 8/2019 | Lavallee et al. | |

* cited by examiner

FOLDING CONTROL STICK AND LOCKING MECHANISM

STATEMENT OF GOVERNMENT INTEREST

This invention was made with Government support under Agreement No. W911W6-19-9-0005, awarded by the Army. The Government has certain rights in the invention.

FIELD OF INVENTION

Embodiments described herein relate to aircraft control sticks and, in particular, to placement of a collective control stick to preventing interference with pilot movements.

BACKGROUND

Traditional helicopter control schemes include a collective control stick located on the left side of each crew station. In traditional aircraft and cockpit layouts, the collective control stick placement can interfere with crew ingress and egress on the aircraft through the main doorway requiring the crew to step over or navigate around in order to access or exit the cockpit. As aircraft footprints are redesigned for more streamlined profiles and smaller cross-sectional areas, the collective control stick interference is magnified. Interference in the ingress and egress to the aircraft causes a hazard to the crew, increasing the likelihood of injury due to accident, and a hazard to the equipment, as the collective grip inputs or other sensitive equipment can become snagged on crew gear or otherwise broken as the crew maneuvers around the stick.

Aircraft with smaller cockpit ingress and egress areas sometimes implement a solution to mitigate interfering placement of the collective control stick; however, these solutions have shortcomings. For example, in one design the collective control stick is detached by unscrewing a lock nut at a base of the stick and then removing the stick. However, this exercise is time-consuming and inconvenient, could result in loss of or damage to the stick and lock nut, and therefore often bypassed by the crew. In another design, the collective control stick telescopes between a deployed position and a stowed position; however, this solution only reduces the overall footprint of the stick by 15% of its total length.

SUMMARY

Embodiments described herein provide a control input operable by a user for controlling movement of an aircraft, the control input comprising a base portion, a grip portion and a lock mechanism. The base portion is configured for coupling to a support surface, the base portion biased towards a neutral position defined along a central axis and pivotable to a plurality of angular positions relative to the central axis. The grip portion includes inputs for controlling movement of the aircraft and is pivotally coupled to the base portion. The grip portion is pivotable between a first position in which the grip portion extends from the base portion and a second position in which the grip portion is pivoted relative to the base portion. The lock mechanism is for locking the grip portion in the first position wherein releasing the lock mechanism allows the grip portion to move to the second position.

Embodiments described herein provide a control system for an aircraft, the control system comprising a control input operable by a user to provide flight command inputs and a controller coupled to the control input, the controller including an electronic processor and a memory to perform control functionality of the aircraft based on flight command inputs from the user. The control input includes a base portion biased towards a neutral position defined along a central axis and pivotable to a plurality of angular positions relative to the central axis, a grip portion including inputs and pivotally coupled to the base portion, the grip portion pivotable between a first position in which the grip portion inputs are useable by the user and a second position in which the grip portion inputs are not useable by the user, and a lock mechanism for holding the grip portion in the first position. The flight command inputs include the angular position of the base portion relative to the central axis and the inputs on the grip portion.

Embodiments described herein provide an aircraft comprising an airframe defining a main body of the aircraft, the airframe including frame members and a doorway, a cockpit in the airframe wherein the doorway allows for ingress to and egress from the cockpit, the cockpit including a support surface and at least one seat positioned proximate the doorway, and a control input positioned between the seat and the doorway, the control input pivotable between a first position and a second position. The control input includes a base portion configured for mounting to the support surface, a grip portion pivotally coupled to the base portion and including inputs for controlling movement of the aircraft, and a lock mechanism for holding the grip portion in position relative to the base portion. When the control input is in the first position, the grip portion is positioned in a deployed position and blocks at least a portion of the doorway, and when the control input is in the second position, the grip portion is in a stow position and clear of the doorway.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
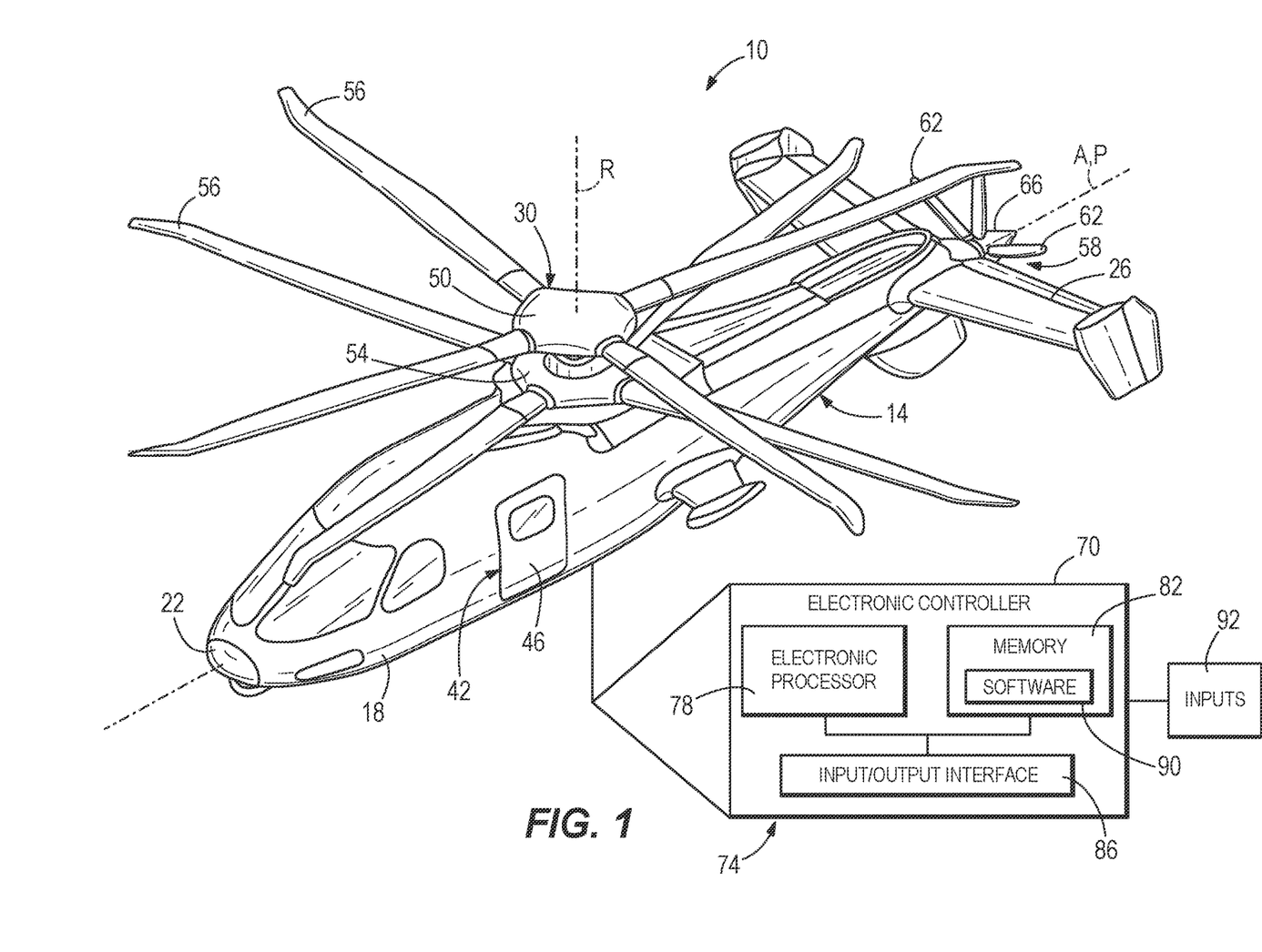
FIG. 1 illustrates a rotary wing aircraft according to an exemplary embodiment.

Referring now to the figures, FIG. 1 illustrates a rotary wing aircraft 10 according to some embodiments. The rotary wing aircraft 10 shown in FIG. 1 is a co-axial wing aircraft. While FIG. 1 provides an example of a rotary wing aircraft, systems and features described herein may also be utilized in different types of aircrafts. For example, systems and features described herein may be utilized in turboprop aircraft, a piston aircraft, a jet, a fixed wing aircraft, a transport aircraft, or some other suitable aircraft or air vehicle.

The aircraft 10 includes a main body 14 including an airframe 18 that extends along a longitudinal axis A between a nose 22 and a tail 26. The aircraft 10 includes a main rotor assembly 30 coupled to the main body 14 between the nose 22 and the tail 26. In the illustrated embodiment, the main rotor assembly 30 is a dual, counter-rotating, co-axial rotor assembly that rotates about a main rotor axis R. The axis R is generally perpendicular to the longitudinal axis A. Other embodiments may include different rotor assembly styles, for example, a single rotor assembly or multiple lift-generating rotors displaced laterally or longitudinally. The main body 14 defines a cockpit 34 (FIG. 2) in the airframe 18 having one or more seats 38, 40 for flight crew. A doorway 42 (FIGS. 3A and 3B) is formed in the airframe 18 to allow for ingress to and egress from the cockpit 34 and is closed by a door 46. In further embodiments, the aircraft may have a tandem seating arrangement with the pilot seated in front of the co-pilot.

The main rotor assembly 30 is driven by a power source, such as, for example, one or more motors via a main rotor gearbox. The one or more motors can include an electric motor, a piston engine, a gas turbine, or other device for providing lift and thrust forces. The main rotor assembly 30 includes an upper rotor assembly 50 driven in a first direction (e.g., counter-clockwise) about the rotor axis R, and a lower rotor assembly 54 driven in a second direction (e.g., clockwise) about the rotor axis R, wherein the second direction is opposite to the first direction (i.e., to provide two counter rotating rotors). Each of the rotor assemblies 50, 54 including a plurality of blades 56 mounted to the rotor hub.

As illustrated in FIG. 1, the aircraft 10 also includes a tail rotor 58 located at the tail 26 to provide translational thrust (forward or rearward) for the aircraft 10. Although FIG. 1 illustrates the tail rotor 58 in the context of a pusher-propeller configuration, in other embodiments, the tail rotor may be a puller-propeller, may be mounted in a static configuration or a variable position with respect to the aircraft 10, or include more than one pusher-propellers. With continued reference to FIG. 1, the tail rotor 58 includes a plurality of blades 62 mounted to a rotor hub 66. The tail rotor 58 is rotatably mounted to the tail 26 for rotation about a propeller axis P. In the illustrated embodiment, the propeller axis P is parallel to the longitudinal axis A. In some embodiments, the propeller axis P may be coaxial with the longitudinal axis A.

As also illustrated in FIG. 1 (in an expanded view), the aircraft 10 includes an electronic controller 70 that is part of a flight control system 74. The electronic controller 70 includes a plurality of electrical and electronic components that provide power, operation control, and protection to the components and modules within the electronic controller. The electronic controller 70 includes an electronic processor 78 (such as a programmable electronic microprocessor or similar device) that executes software to control operation of the main rotor assembly 30 and the tail rotor assembly 58. In the example illustrated in FIG. 1, the electronic controller 70 also includes memory 82 (for example, non-transitory, machine-readable memory, such as, for example, a hard disk, a CD-ROM, an optical storage device, a magnetic storage device, a ROM, a programmable read-only memory (PROM), an EEPROM, an erasable programmable read-only memory (EPROM), and a Flash memory) and an input-output interface 86. The electronic processor 78 is communicatively connected to the memory 82 and the input-output interface 86. In some embodiments, the memory 82 stores software 90 executable by the electronic processor 70 to perform the control functionality and associated methods described herein. It should be understood that the electronic controller 70 can include other components, the configuration illustrated in FIG. 1 is provided as one example, and that other types of control systems, such as fly-by-wire or mechanical linked systems, may be used in the aircraft 10.

The flight control system 74 and electronic controller 70 receive inputs 92 as control commands from various sources in the aircraft 10. For instance, the inputs 92 can be pilot inputs, auto-pilot inputs, navigation system based inputs, or any control inputs from one or more control loops executed by the electronic controller or other subsystems. For example, the inputs include cyclic, collective, pitch rate, and throttle commands that control the aircraft 10.

Figure 2:
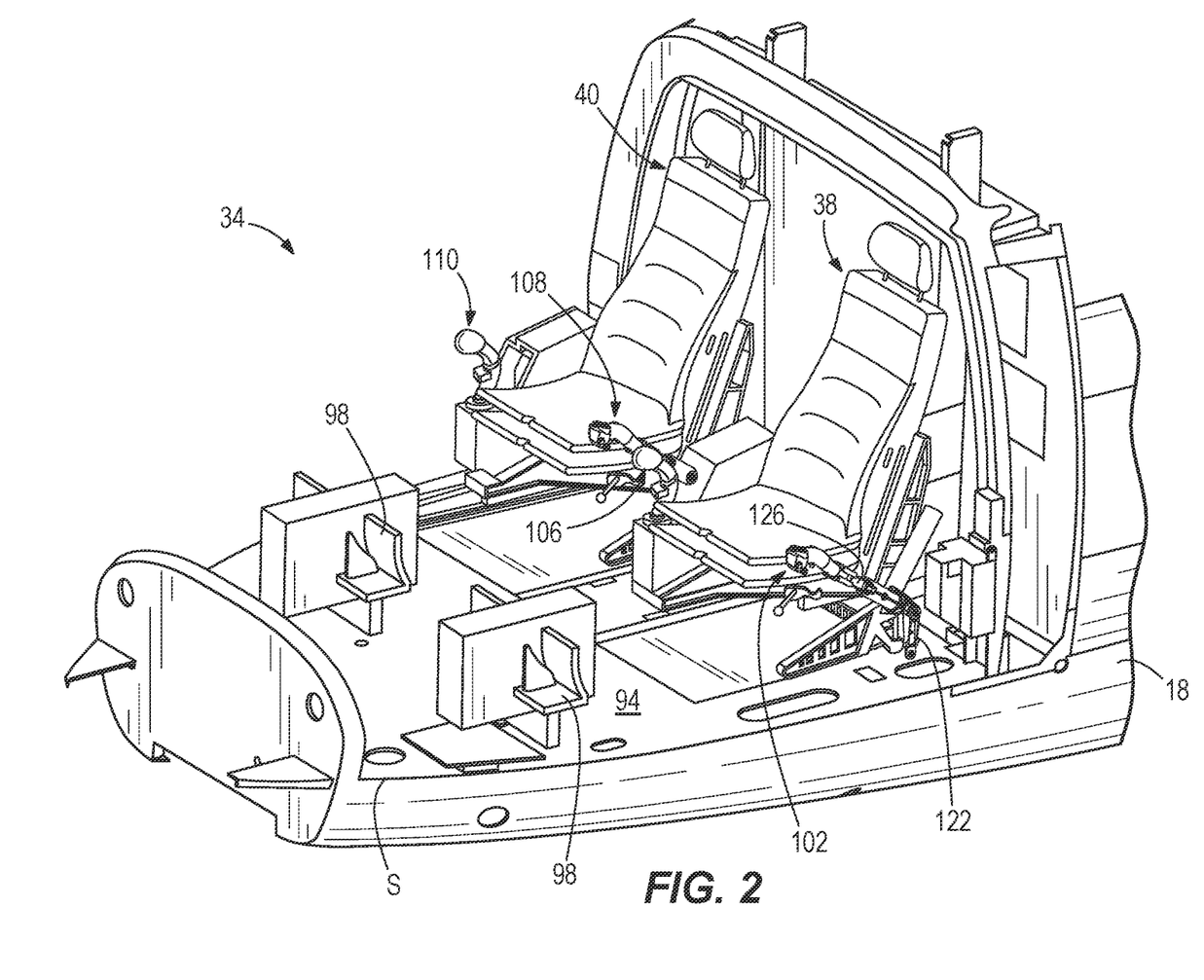
FIG. 2 illustrates a front perspective view of an example cockpit of the rotary wing aircraft of FIG. 1.

FIG. 2 illustrates the cockpit 34 of the aircraft 10 with portions of the airframe 18 removed. The cockpit 34 includes a support surface 94, or floor, upon which a co-pilot seat 38, a pilot seat 40, control pedals 98, control sticks 102, 106, 108, 110 for the flight control system 74, and other components are supported or mounted. In the illustrated embodiment, the control sticks 102, 106, 108, 110 include a collective control sticks 102, and cyclic control sticks 106, 110. The collective sticks 102, 108 are used for lift control of the upper rotor assembly 50 and lower rotor assembly 54 of the main rotor assembly 30, either collectively or differentially. By way of example, the collective stick 102 is mounted to a support member 114 (FIGS. 3A and 3B) and biased towards a neutral position defined along a central axis C of the stick 102. The collective stick 102 is pivotable to a plurality of angular positions relative to the central axis C and the support member 114. The angular positions of the collective stick 102 correspond with changes to the pitch angle of the main rotor blades 56 on the upper rotor assembly 50 and lower rotor assembly 54, thereby providing lift control to the aircraft 10.

Figure 3A:
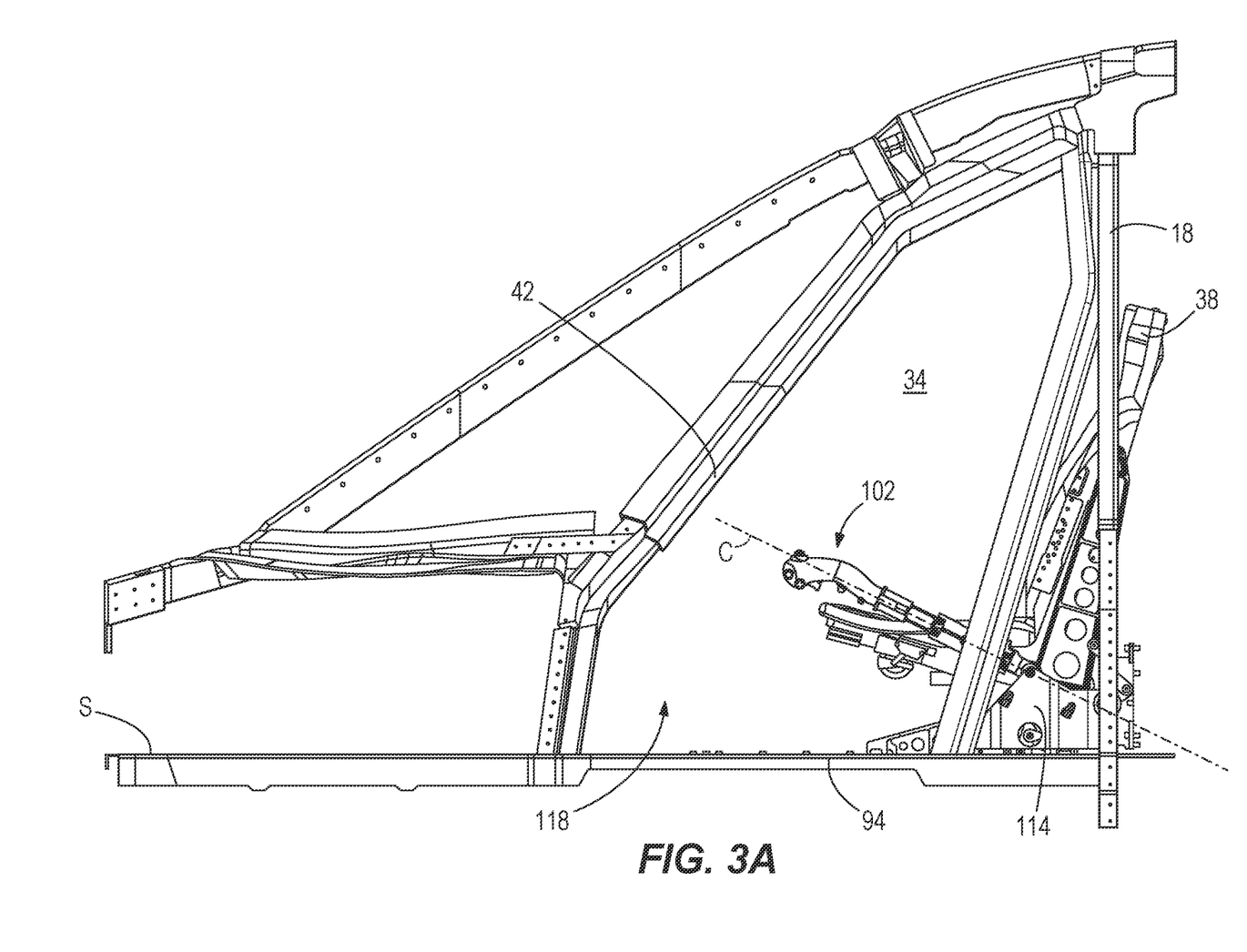
FIG. 3A illustrates a side view of the cockpit showing a collective stick in a deployed, use position.

The collective stick 102 is positioned on a left side of the co-pilot seat 38 to be operated by a pilot's left hand, which places the collective stick 102 proximate the doorway 42 such that the collective stick 102 is positioned between the co-pilot seat 38 and the airframe 18 and interferes with the doorway 42. As seen in FIG. 3A, the doorway 42 defines an ingress/egress path 118 to and from the cockpit 34 and the aircraft seats 38, 40. When the collective stick 102 is in a use or deployed position (FIGS. 3A and 4A), the collective stick 102 interferes with the ingress/egress path 118 through the doorway 42. Blocking the ingress/egress path 118 requires a flight crew to maneuver around the collective stick 102 as they enter or exit the cockpit 34, which may cause harm to the flight crew or damage to the collective stick 102 in the process. The collective stick 102 is pivotable to a stow position, shown in FIGS. 3B and 4B, such that the collective stick 102 does not block the ingress/egress path 118 for the flight crew. In the illustrated embodiment, a portion of the collective stick 102 is pivotable relative to another portion of the collective stick 102; however, further embodiments, the entire collective stick 102 or a portion of the collective stick 102 may be pivotable relative to the support member 114. In other words, a sufficient portion of the collective stick 102 is movable to the stow position and does not block the doorway 42 or the ingress/egress path 118 so as to allow the flight crew to quickly, easily and safely enter or exit the cockpit 34.

The collective stick 102 includes a base portion 122, a grip portion 126 pivotally coupled to the base portion 122, and a lock mechanism 130 that secures the grip portion 126 relative to the base portion 122. In the illustrated embodiment, the lock mechanism 130 is a quick-release mechanism including a cam lock feature; however, in other embodiments, different types of lock mechanisms may be used to hold the grip portion 126 in position relative to the base portion 122 or the support member 114.

The base portion 122 is generally V-shaped in the illustrated embodiment including a distal portion 134 pivotally coupled to a proximal portion 138 at a first pivot point 142, but can have other shapes and configurations in further embodiments. A proximal end 138A of the base portion 122 is coupled to the support member 114, or in some embodiments, the support surface 94 to mount the collective stick 102 in the cockpit 34. In the illustrated embodiment, the base portion 122 is also coupled to the support member 114 at the first pivot point 142. During use by the co-pilot and when the collective stick 102 is in the deployed position, the collective stick 102 is pivotable about the first pivot point 142 to the plurality of angular positions by pushing down or pulling up on the grip portion 126 to effect changes to the pitch angle of the main rotor blades 56 on the main rotor assembly 30.

Figure 4A:
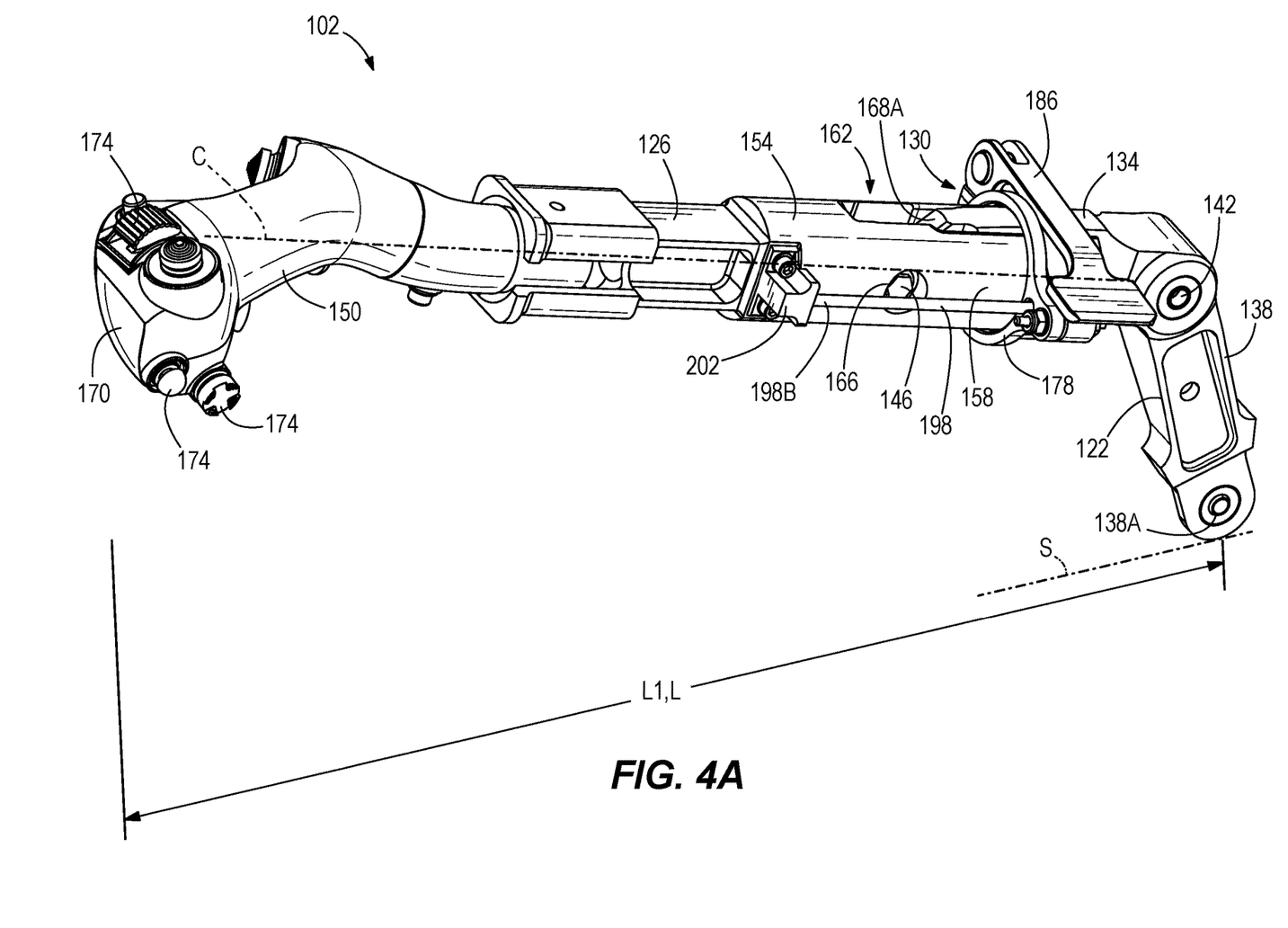
FIG. 4A illustrates the collective stick shown in FIG. 3A in the deployed position.
Figure 4B:
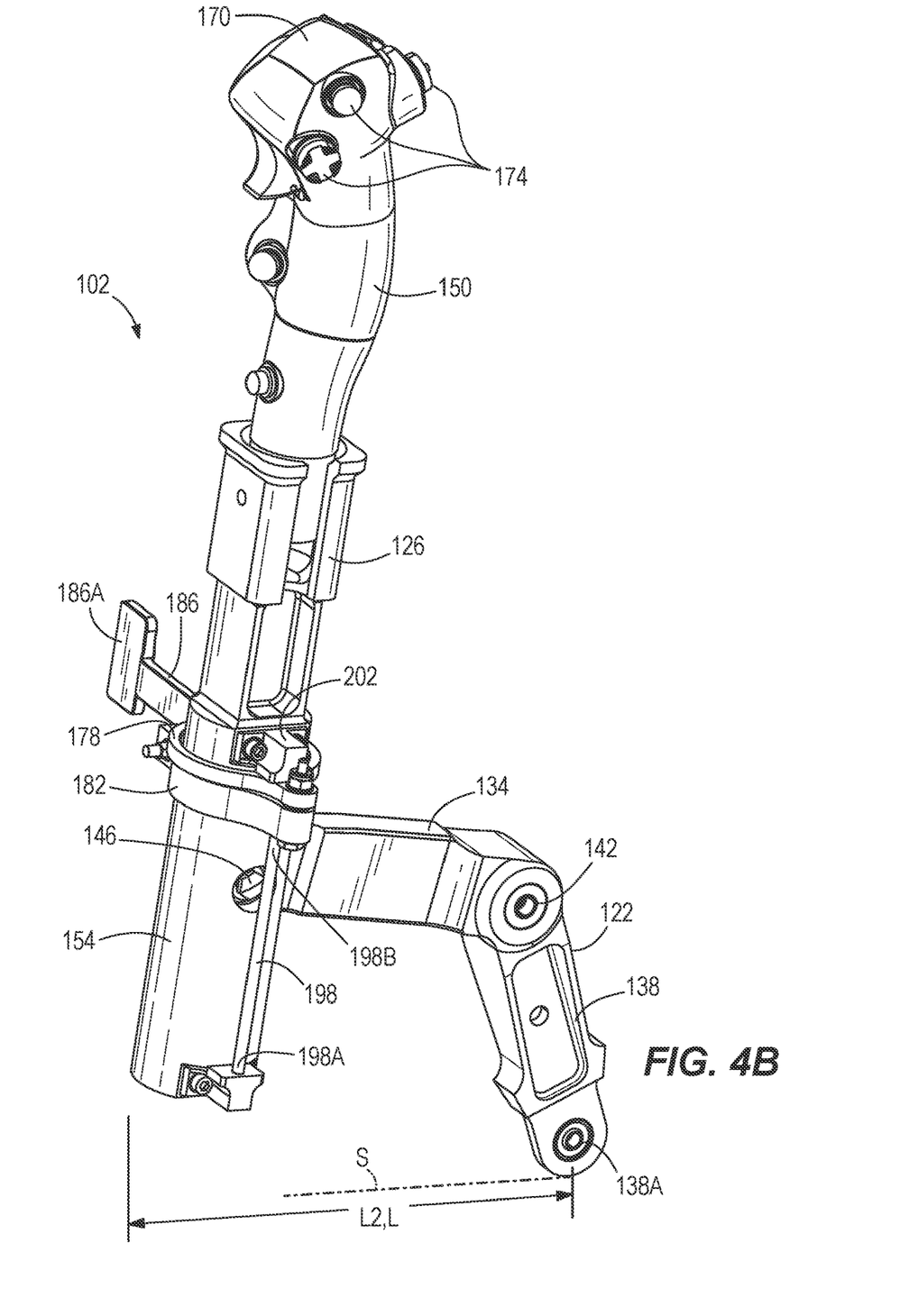
FIG. 4B illustrates the collective stick shown in FIG. 3B in the stowed position.

The grip portion 126 is coupled to the base portion 122 at a second pivot point 146 located on the distal portion 134. In the illustrated embodiment, the two portions 122, 126 of the collective stick 102 are coupled together by a fastener 166, although in further embodiments, other types of pivotable connections could be used such as a pivotable connector, bearing connection, hinge joint, ball and socket, or the like. Referring to FIGS. 4A and 4B, the second pivot point 146 is positioned forward of the first pivot point 142 or closer to a grip 150 of the collective stick 102 than the first pivot point 142. In further embodiments, the second pivot point 146 may be positioned closer to the first pivot point 142, coaxial with the first pivot point 142, or even rearward of the first pivot point 142. In still further embodiments, the grip portion 126 and base portion 122 may be fixed relative to each other and the collective stick 102 pivots relative to the support member 114 or support surface 94 to move between the deployed position and the stow position.

Figure 5:
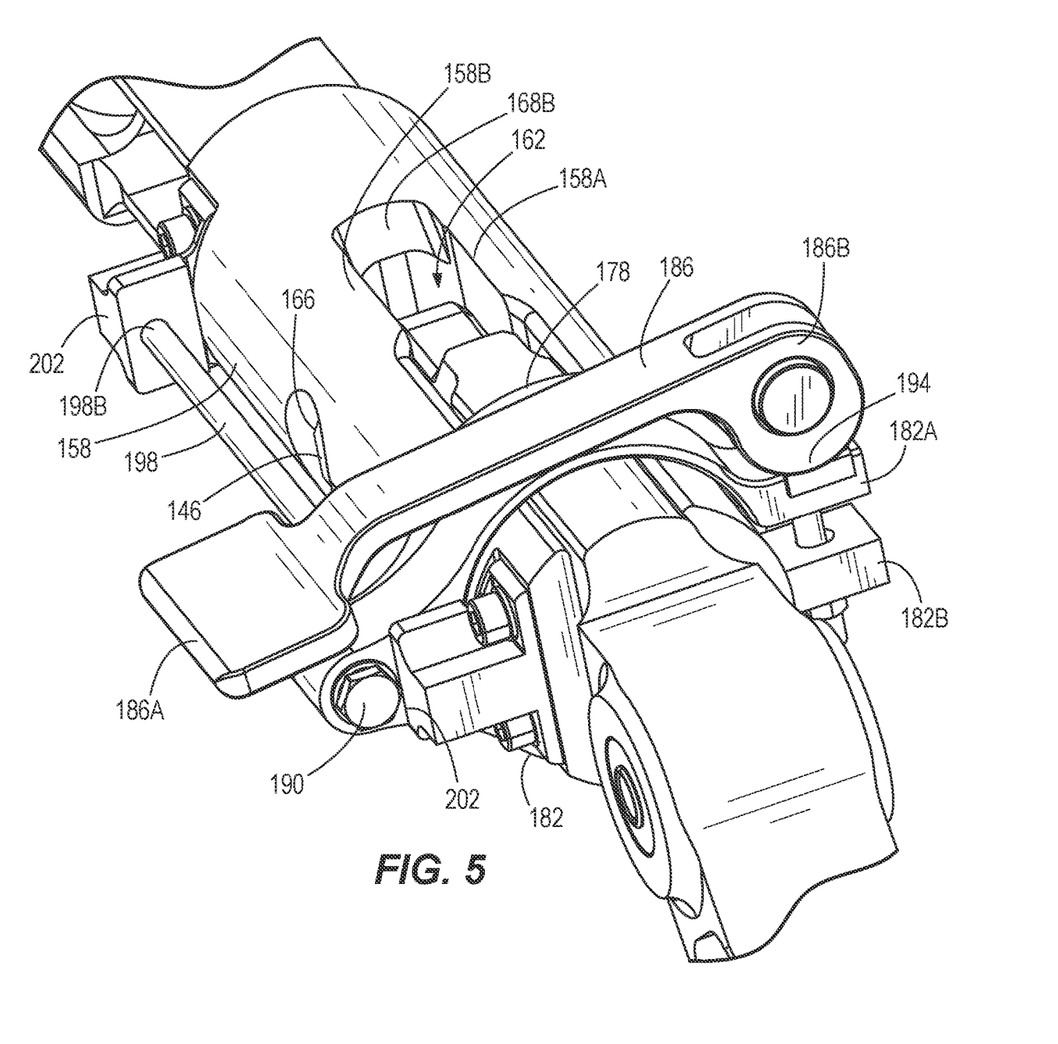
FIG. 5 illustrates a portion of the collective stick including a lock mechanism for holding the collective stick in the deployed position.

The grip portion 126 includes the grip 150 and an arm member 154 having a proximal end 158 pivotally coupled to the base portion 122 at the second pivot point 146. In the illustrated embodiment, the proximal end 158 is split defining a first leg 158A and a second leg 158B with an opening 162 therebetween. The distal portion 134 of the base portion 122 is seated in the opening 162 of the grip portion 126 and the two are coupled together by the fastener 166 defining the second pivot point 146. Referring to FIGS. 4A and 5, the base portion 126 includes an interface surface 168A formed at a distal end and the grip portion 126 includes an interface surface 168B formed at an intersection between the legs 158A, 158B. A distal end 170 of the grip portion 126 defines the grip 150 so that the co-pilot can grasp and operate the collective stick 102. Inputs 174 are located on the grip 150 for controlling operation of the aircraft 10, and the inputs 174 may include heading adjustment, data recording, differential cyclic adjustment, propeller control, collective trim release and others. The inputs 174 along with the angular position of the collective stick 102 when in the deployed position provide flight command inputs 92 to the electronic controller for the aircraft 10.

When the collective stick 102 is in the deployed position (FIGS. 3A and 4A), the lock mechanism 130 is in a lock position and holds the grip portion 126 relative to the base portion 122 such that the grip portion 126 cannot move. In the deployed position, the co-pilot is able to use the collective stick 102 in order to provide flight command inputs 92 to the aircraft 10. The lock mechanism 130 securely locks the collective stick 102 in the deployed position and provides rigidity to the collective stick 102 that eliminates backlash and does not impact the ability to control the aircraft 10. The lock mechanism 130 also prevents inadvertent release and movement of the collective stick 102 to the stow position, and provides the flight crew with a physical and visual indication of when the collective stick 102 is in the lock position.

In order to unlock the collective stick 102, the lock mechanism 130 is moved to a release position (FIGS. 3B and 4B), which unlocks the grip portion 126 with respect to the base portion 122. Once the lock mechanism 130 is released, the lock mechanism 130 is moved up the arm member 154 towards the grip 150 such that the lock mechanism 130 does not interfere with the base portion 122. Once the lock mechanism 130 is clear of the base portion 122, the grip portion 126 is moved to the stow position such that the collective stick 102 is clear of the ingress/egress path 118. In the stow position, the interface surface 168A of the base portion 122 and the interface surface 168B of the grip portion 126 engage in order to hold the collective stick in the stow position. In the illustrated embodiment, the grip portion is pivoted upward relative to the support surface 94; however, in further embodiments, the grip portion may be pivoted downward and out of the way. Moving the collective stick 102 to the stow position shortens its effective length L such that the collective stick 102 does not block the doorway 42 or the ingress/egress path 118. The lock mechanism 130 allows the flight crew to quickly and easily move the collective stick 102 to a stow position without dissembling the collective stick 102 and providing a convenient mechanism for removing the collective stick 102 from the ingress/egress path 118.

It should be recognized by one of skill in the art that any control stick of the aircraft 10 could be pivotable between a deployed position and a stow position utilizing the pivot feature and lock mechanism of the present invention. For example, in other aircraft, a cyclic control stick may be positioned adjacent a doorway and require a mechanism to move the control stick quickly and easily out of the way to allow ingress or egress from the cockpit. Still further, control sticks positioned in other areas of the cockpit may require a mechanism to move the stick out of a pilot's path.

Referring to FIGS. 4A-5, the lock mechanism 130 is a quick-release mechanism and includes a retention collar 178, a locking member 182, and an actuation handle 186. The retention collar 178 encircles an outer perimeter of the collective stick 102 proximate the second pivot point 146 between the grip portion 126 and the base portion 122. The lock member 182 also encircles an outer perimeter of the collective stick 102 proximate the second pivot point 146 and is coupled to the retention collar 178 via a fastener 190. In the illustrated embodiment, the locking member 182 is a C-clamp including a first clamp end 182A and a second clamp end 182B, which when forced towards each other locks the grip portion 126 relative to the base portion 122 of the collective stick 102. The handle 186 includes a first, free end 186A and a second, cam end 186B coupled to the locking member 182, with the second end 186A defining a cam surface 194. When the lock mechanism 130 is in the lock position, the cam surface 194 pushes downward on the first clamp end 182A of the locking member 182 such that force is applied to hold the base and grip portions 122, 126 together. By lifting up on the free end 186A of the handle, the lock mechanism 130 is moved to the release position. In the release position, the cam surface 194 is removed from the first clamp end 182A thereby releasing the locking member 182 and allowing the grip portion 126 to pivot relative to the base portion 122. In further embodiments, the lock mechanism 130 may also be used to lock the collective stick 102 in the stow position.

It should be recognized by one of skill in the art that the lock mechanism 130 may include other types of locking mechanisms to hold the collective stick 102 in a deployed position and/or a stow position. Further, the locking mechanism should provide rigidity to the collective stick 102 in the deployed position that does not induce mechanical backlash or slop such that the pilot or co-pilot's ability to control the aircraft 10 is not compromised. In addition, the locking mechanism should be quickly and easily operated by the flight crew to ensure it is convenient to use, but prevents inadvertent movement of the collective stick 102 to the stow position. Examples of other locking mechanisms include, but are not limited to, a retractable pin, a quick-release pin, or an expandable pin independently or in combination with a lever or latch, a spring-loaded collar, a hinged attachment with a latch, screw, pin or locking lever, and the like.

The grip portion 126 includes a guide rail 198 extending a length of the arm member 154, and having a first end 198A and a second end 198B. The retention collar 178 and locking member 182 slidably receive the guide rail 198 through apertures (not shown). Once the lock mechanism 130 is moved to the release position, a user slides the lock mechanism 130 along the guide rail 198 from the first end 198A (corresponding to the lock position) and the second end 198B (corresponding to the release position) such that the lock mechanism 130 no longer interferes with the base portion 122. Once the lock mechanism 130 is clear of the base portion 122 and the opening 162, a user may then pivot the grip portion 126 relative to the base portion 122 to move the grip portion to the stow position. Each of the first and second ends 198A, 198B of the guide rail 198 include a stop member 202 defining a travel path for the lock mechanism 130, and thereby the angle of rotation between the grip portion 126 and the base portion 122.

Figure 3B:
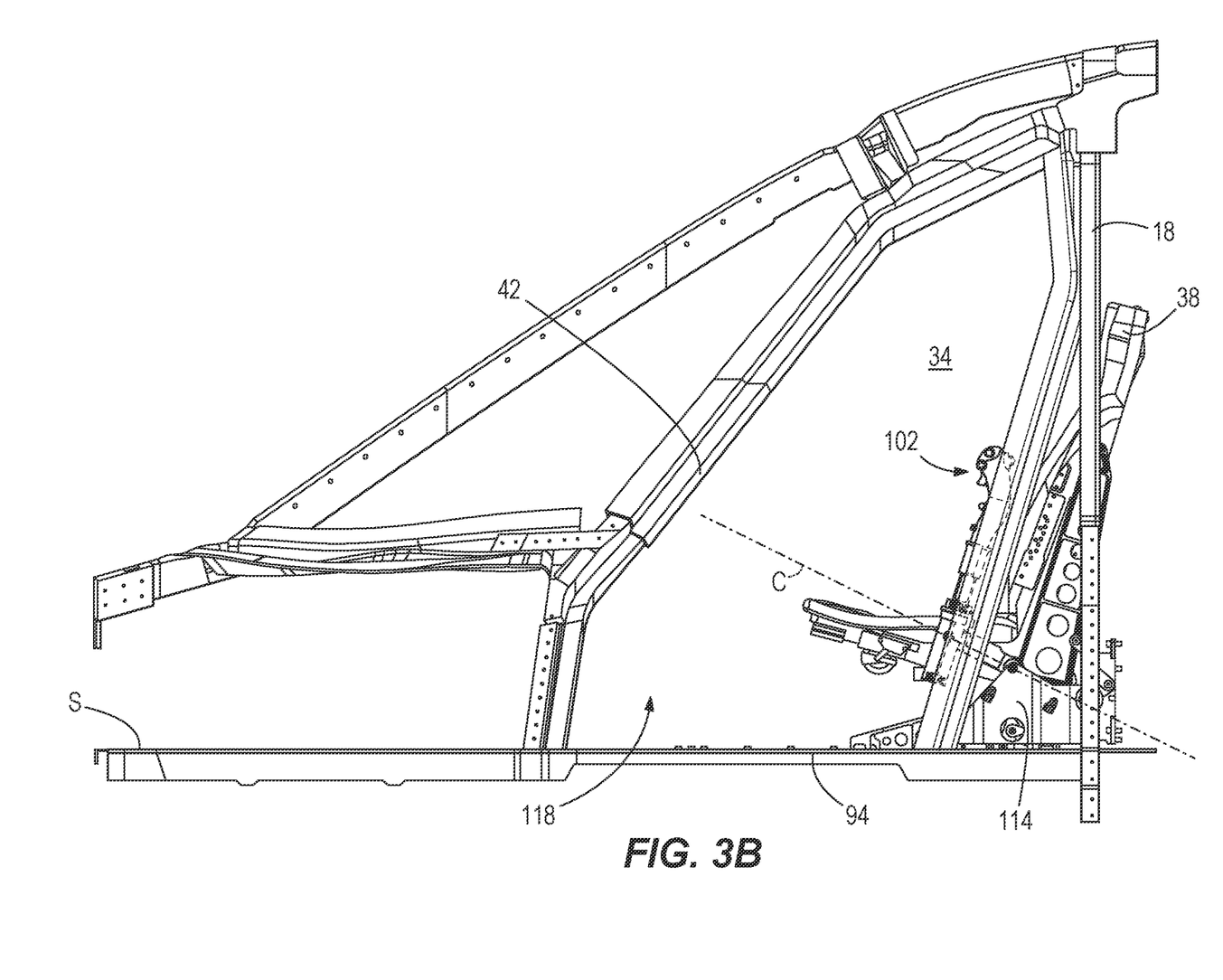
FIG. 3B illustrates a side view of the cockpit showing the collective stick in a folded, stowed position.

When the collective stick 102 is fully extended to the deployed position, the collective stick 102 has a first length L1 extending from the proximal end 138A of the base portion 122 to the distal end 170 of the grip 150 and measured along a plane S parallel to the support surface 94 of the cockpit 34. The first length L1 is such that the collective stick 102 blocks the doorway 42 and interferes with the ingress/egress path 118, as shown in FIG. 3A. Once the collective stick 102 is pivoted to the stow position, the collective stick 102 has a second length L2, also measured along the plane S parallel to the support surface 94 of the cockpit 34, from the proximal end 138A of the base portion 122 to a furthest extent of the collective stick 102 along the plane S. The first and second lengths L1, L2 define an effective length L of the collective stick 102 when it is in the use and stow positions, respectively. In the illustrated embodiment, the second length L2 is approximately 70% of the first length L1. As shown in FIG. 3B, the second length L2 is such that the collective stick 102 in the stow position does not block the doorway 42 or interfere with the ingress/egress path 118.

Embodiments disclosed herein are primarily for exemplary purposes. It should be understood that alternative embodiments or various combinations of features described herein may be implemented.

Various features and advantages of the embodiments described herein are set forth in the following claims.

What is claimed is:

1. A control input operable by a user for controlling movement of an aircraft, the control input comprising:
   a base portion configured for coupling to a support surface, the base portion biased towards a neutral position defined along a central axis and pivotable to a plurality of angular positions relative to the central axis;
   a grip portion including inputs for controlling movement of the aircraft and pivotally coupled to the base portion, the grip portion pivotable between a first position in which the grip portion extends from the base portion and a second position in which the grip portion is folded relative to the base portion; and
   a lock mechanism for locking the grip portion in the first position wherein releasing the lock mechanism allows the grip portion to move to the second position,
   wherein the grip portion includes a grip having the inputs defined thereon, and an arm member extending from the grip and pivotally coupled to the base portion, and
   wherein the grip portion includes a guide rail spaced from and extending along a length of the arm member, the guide rail having a first end and a second end, and further wherein the lock mechanism slides along the guide rail as the grip portion moves between the first position and the second position.

2. The control input of claim 1 wherein the lock mechanism is a quick-release mechanism and is movable between a lock position, in which the grip portion is locked in the first position, and a release position, in which that grip portion is movable relative to the base portion.

3. The control input of claim 2 wherein the quick-release mechanism includes a retention collar slidable along the grip portion, the lock mechanism carried by the retention collar, and an actuation handle for moving the lock mechanism between a lock position and a release position.

4. The control input of claim 1 wherein the first end of the guide rail defines a first stop member and the second end of the guide rail defines a second stop member.

5. The control input of claim 1 wherein the base portion defines a first pivot point, about which the base portion is pivotable relative to the central axis, and a second pivot point, the grip portion coupled to the base portion at the second pivot point, and further wherein the second pivot point is positioned closer to the grip than the first pivot point.

6. The control input of claim 5, wherein, in the first position, the second pivot point is positioned closer to the grip than the lock mechanism.

7. A control system for an aircraft, the control system comprising:
- a control input operable by a user to provide flight command inputs, the control input including,
  - a base portion biased towards a neutral position defined along a central axis and pivotable to a plurality of angular positions relative to the central axis,
  - a grip portion including inputs and pivotally coupled to the base portion, the grip portion pivotable between a first position in which the grip portion inputs are useable by the user and a second position in which the grip portion inputs are not useable by the user, and
  - a lock mechanism for holding the grip portion in the first position; and
- a controller coupled to the control input, the controller including an electronic processor and a memory to perform control functionality of the aircraft based on flight command inputs from the user, wherein the flight command inputs include the angular position of the base portion relative to the central axis and the inputs on the grip portion, wherein the control input has an effective length and an effective height, and wherein, when the grip portion is in the second position, the effective length of the control input is reduced and the effective height of the control input is increased.

8. The control system of claim 7 wherein the grip portion includes a grip having the inputs defined thereon, and an arm member extending from the grip and pivotally coupled to the base portion.

9. The control system of claim 7, wherein the lock mechanism is a quick-release mechanism and is movable between a lock position, in which the grip portion is held in the first position, and a release position, in which the grip portion is pivotable relative to the base portion.

10. The control system of claim 9 wherein the quick-release mechanism includes a retention collar slidable along the grip portion, the lock mechanism carried by the retention collar, and an actuation handle for moving the lock mechanism between the lock position and the release position.

11. The control system of claim 7 wherein the grip portion includes a guide rail extending along a length of the grip portion and the lock mechanism slides along the guide rail as the grip portion moves between the first position and the second position, and further wherein a first end of the guide rail defines a first stop member and a second end of the guide rail defines a second stop member.

12. The control system of claim 7 wherein when the grip portion is in the second position the effective length of the control input is reduced by 70%.

13. An aircraft comprising:
- an airframe defining a main body of the aircraft, the airframe including frame members and a doorway;
- a cockpit in the airframe wherein the doorway allows for ingress to and egress from the cockpit, the cockpit including a support surface and at least one seat positioned proximate the doorway; and
- a control input positioned between the seat and the doorway, the control input pivotable between a first position and a second position, the control input including
  - a base portion configured for mounting to the support surface,
  - a grip portion pivotally coupled to the base portion and including inputs for controlling movement of the aircraft, and
  - a lock mechanism for holding the grip portion in position relative to the base portion,
- wherein, when the control input is in the first position, the grip portion is positioned in a deployed position and blocks at least a portion of the doorway forward of the at least one seat, and when the control input is in the second position, the grip portion is folded in a stow position and clear of the doorway.

14. The aircraft of claim 13 wherein the doorway defines an ingress/egress path, when the grip portion is in the deployed position at least a portion of the ingress/egress path is blocked, and when the grip portion is in the stow position the ingress/egress path is clear.

15. The aircraft of claim 13 wherein an effective length of the control input is reduced by 70% when the grip portion is in the stow position.

16. The aircraft of claim 13 further comprising a controller coupled to the control input, the controller including an electronic processor and a memory to perform control functionality of the aircraft based on flight command inputs from the user, wherein the flight command inputs include an angular position of the base portion relative to a central axis of the control input and the inputs on the grip portion.

17. The aircraft of claim 13, and wherein the lock mechanism is a quick-release mechanism and is movable between a lock position, in which the grip portion is held in the first position, and a release position, in which the grip portion is pivotable relative to the base portion.

18. The aircraft of claim 17 wherein the quick-release mechanism includes a retention collar slidable along the grip portion, the lock mechanism carried by the retention collar, and a release handle for moving the lock mechanism between a lock position and a release position.

19. The aircraft of claim 13 wherein the grip portion includes a guide rail extending along a length of the grip portion and the lock mechanism slides along the guide rail as the grip portion moves between the first and second positions, and further wherein a first end of the guide rail defines a first stop member and a second end of the guide rail defines a second stop member.

* * * * *